April 17, 1956

C. A. BROWN 2,742,358

STABILIZED DICHROMATED POLYVINYL
ALCOHOL COATING MATERIAL

Filed Aug. 3, 1953

INVENTOR
Clarence A. Brown
BY Olsen & Olsen
ATTORNEYS

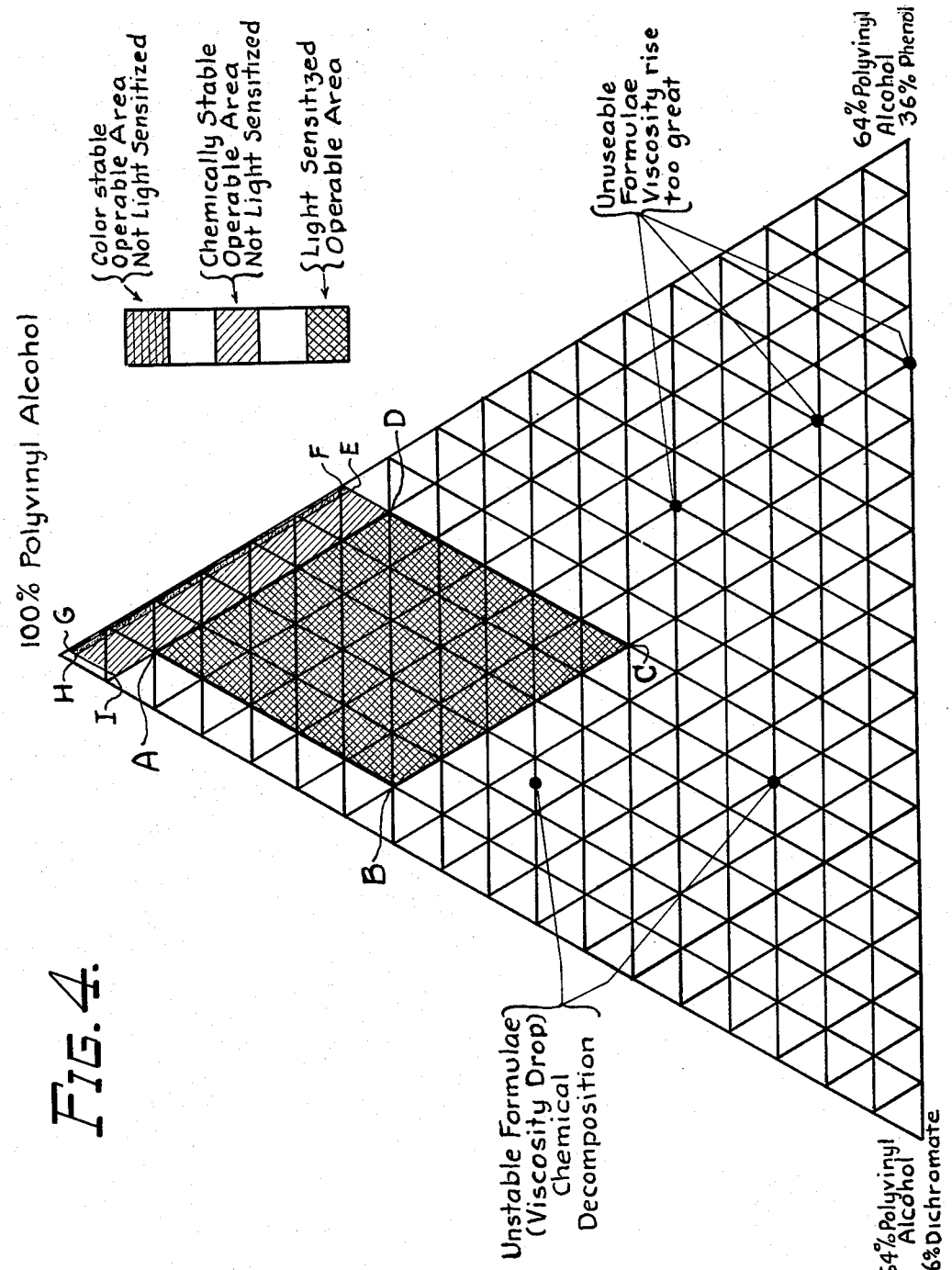

United States Patent Office 2,742,358
Patented Apr. 17, 1956

2,742,358

STABILIZED DICHROMATED POLYVINYL ALCOHOL COATING MATERIAL

Clarence A. Brown, Toledo, Ohio, assignor to Jones Graphic Products Company, Albuquerque, N. Mex., a corporation of New Mexico Application August 3, 1953, Serial No. 372,087

8 Claims. (Cl. 95—7)

This invention relates to a stabilized dichromated polyvinyl alcohol coating material, and has as its primary object the provision of such material having increased stability, and shelf life sufficient to make possible its use in making printing plates, and the like, on a commercial basis.

Dichromated polyvinyl alcohol dispersions have long been the object of research and development in the fields of rotogravure, photoengraving, photolithography and related processes. U. S. Patent No. 2,174,629 to Greiner, describes and claims such compositions in the production of printing plates and the like. In spite of many potential advantages for these dichromated polyvinyl alcohol dispersions, a number of problems have beset the research men in this field and have retarded the adoption of such coating solutions on a commercial basis.

The term "dispersion" is used herein, and in the appended claims, in its generic sense, namely as including solutions, suspensions, emulsions, and other stable solid in liquid or liquid in liquid compositions. The expression "dichromated polyvinyl alcohol dispersion" is used to mean aqueous dispersions containing both polyvinyl alcohol and a dichromate.

Previously know dichromated polyvinyl alcohol dispersions suitable for use in preparing polyvinyl alcohol resists or printing plate coatings as hereinafter described have had a relatively short shelf life, usually not more than one month. With ageing, such solutions become less sensitive to light, decrease in viscosity, lose their elasticity, and show a marked decrease in acid resistance. Apparently, such deterioration of dichromated polyvinyl alcohol dispersions is due to oxidation of the polyvinyl alcohol, accompanied by reduction of the dichromate sensitizing material. Polyvinyl alcohol is believed to depolymerize during such oxidation-reduction reaction, and such depolymerization is thought to be responsible for the lowered viscosity of the aged solutions. A number of factors affect the decomposition of these solutions, such as temperature, type and concentration of dichromate sensitizer, the particular type of polyvinyl alcohol employed, and other factors. The problem of a short shelf life cannot be circumvented, however, merely by careful selection of dichromate sensitizer and of type of polyvinyl alcohol.

Light-sensitized colloids such as fish glue, albumin, gelatin, etc., are subject to bacteriological decomposition, but a dispersion of polyvinyl alcohol containing sufficient dichromate to be light-sensitized, is attacked neither by bacteria nor fungi. However, aqueous dispersions of polyvinyl alcohol alone, or even such dispersions containing, also, a dichromate wherein the total amount of dichromate is less than about 2 per cent of the total amount of polyvinyl alcohol, on a dry weight basis, are subject to molding.

It is an object of this invention, therefore, to provide dichromated polyvinyl alcohol dispersions having substantially increased shelf life, and stabilized against mold formation when the dichromate content thereof is less than about 2 per cent on the basis hereinafter set forth.

Another object of this invention is to provide dichromated polyvinyl alcohol dispersions having increased adherence to metal surfaces over similar solutions now known, and characterized by a further increase in this adherence to metal as the solution ages.

Still another object of this invention is to provide dichromated polyvinyl alcohol dispersion wherein the ratio of dichromate to polyvinyl alcohol may be less than that usually employed in such dispersions without a correspondingly decreased light sensitivity.

Other objects and advantages of the present invention will become apparent from the following description thereof when read in conjunction with the accompanying drawings, in which Fig. 1 is a semi-log, 3 cycle graph illustrating the stabilizing effect of phenol additions upon the viscosity of light sensitized dichromated polyvinyl alcohol dispersions;

Fig. 4 is a triaxial diagram disclosing the useful range of phenol-polyvinyl alcohol-dichromate compositions.

Figure 1:
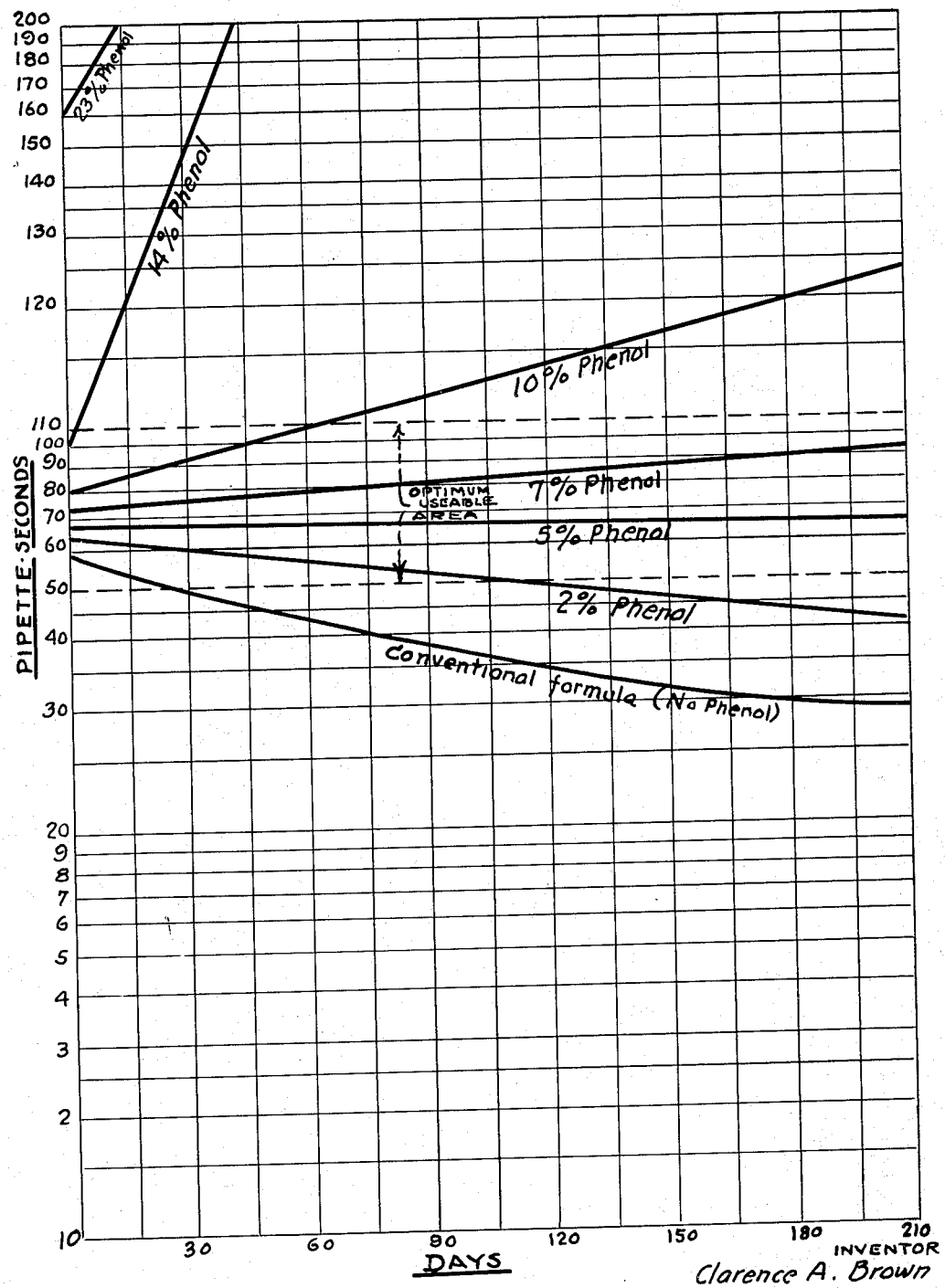

The amounts of phenol, polyvinyl alcohol, and of a dichromate are given herein, in the appended claims, and in the drawings, as percentages based upon the dry weight total of phenol, polyvinyl alcohol, and dichromate. The terms "per cent" and "parts" are used herein, in the appended claims, and in the drawings, to refer to per cent and parts by weight, unless otherwise indicated.

It has been found that the addition of phenol to dichromated polyvinyl alcohol dispersions materially increases the shelf life thereof. When the dichromate content of such dispersions is sufficient that the material is light sensitized, namely, from about 2 per cent to about 12 per cent, such additions of phenol in amounts ranging from about 2 per cent to about 12 per cent tend to stabilize the viscosity and to increase the acid resistance and the adherence of the coating to the base metal. Also, the addition of phenol appears to have a synergistic effect in permitting a lower ratio of dichromate sensitizing agent to polyvinyl alcohol than was heretofore permissible with these dispersions. When the dichromate content of such dispersions is less than 2 per cent, specifically, from 0.02 per cent to 2 per cent, such additions of phenol in amounts ranging from about 0.4 per cent to about 12 per cent prevent molding of the polyvinyl alcohol dispersion; the resulting dispersion is stable chemically, and can be light sensitized to a desired degree by further additions of a dichromate.

In preparing data pertinent to the stabilization, by phenol additions, of light sensitized dichromated polyvinyl alcohol dispersions, the following formula was used as a standard and is hereinafter referred to as the "conventional formula":

| | Ml. |
|---|---|
| 10% dispersion of polyvinyl alcohol (viscosity 30 centipoises, 90% hydrolysis) | 3040 |
| 24% solution of ammonium dichromate | 80 |

To the above conventional formula varying amounts of phenol were added. For example, the following formula defines a 7 per cent phenol composition:

| | Ml. |
|---|---|
| 10% dispersion of polyvinyl alcohol (viscosity 30 centipoises, 90% hydrolysis) | 3040 |
| 24% solution of ammonium dichromate | 80 |
| 90% solution of phenol (USP) | 27 |

The data set forth in the graph of Fig. 1 was obtained from tests made on the conventional formula and on variations of this composition having added thereto the percentage of phenol indicated in the graph. The viscosity of these various dispersions was tested by filling a given 25 cc. pipette with a dispersion and recording the time required for 15 cc. to flow from the pipette. These tests were made at intervals over the period indicated on the graph, so that an accurate comparison of the effect of ageing upon the viscosity of the dispersions tested was obtained.

The optimum usable range indicated in Fig. 1 was determined by long experience with these coating materials under actual use conditions.

It is apparent from Fig. 1 that the viscosity of the conventional formula containing no phenol falls below the optimum usable range within approximately one month. The addition of phenol to the conventional formula increased the viscosity of the fresh solution, and so acts upon the solution to stabilize the viscosity drop as the solution ages. Phenol additions in amounts less than about 2 per cent do not materially increase the shelf life of light sensitized dispersions, but additions of about 2 per cent phenol so decrease the rate of reduction in viscosity upon ageing that the viscosity of such dispersions falls within the optimum usable range for almost four months or four times the shelf life of the same dispersion without the phenol addition. Larger amounts of phenol further decrease the rate of viscosity drop upon ageing, until at 5 per cent phenol very little change, if any, occurs in the viscosity of the dispersion over a seven months period. The addition of seven per cent phenol causes the viscosity to rise slightly, although it is still well within the optimum range after ageing seven months. It is this 7 per cent phenol dispersion that is preferred, however, due to its higher acid resistance as hereinafter discussed. When more than 12 per cent phenol is added, the viscosity of the dispersion increases so fast that within a month the dispersion is so viscous as to be very difficult to use. Large amounts of phenol, such as 23 per cent, are clearly impracticable since they will cause rapid gelling of the dispersion.

Figure 2:
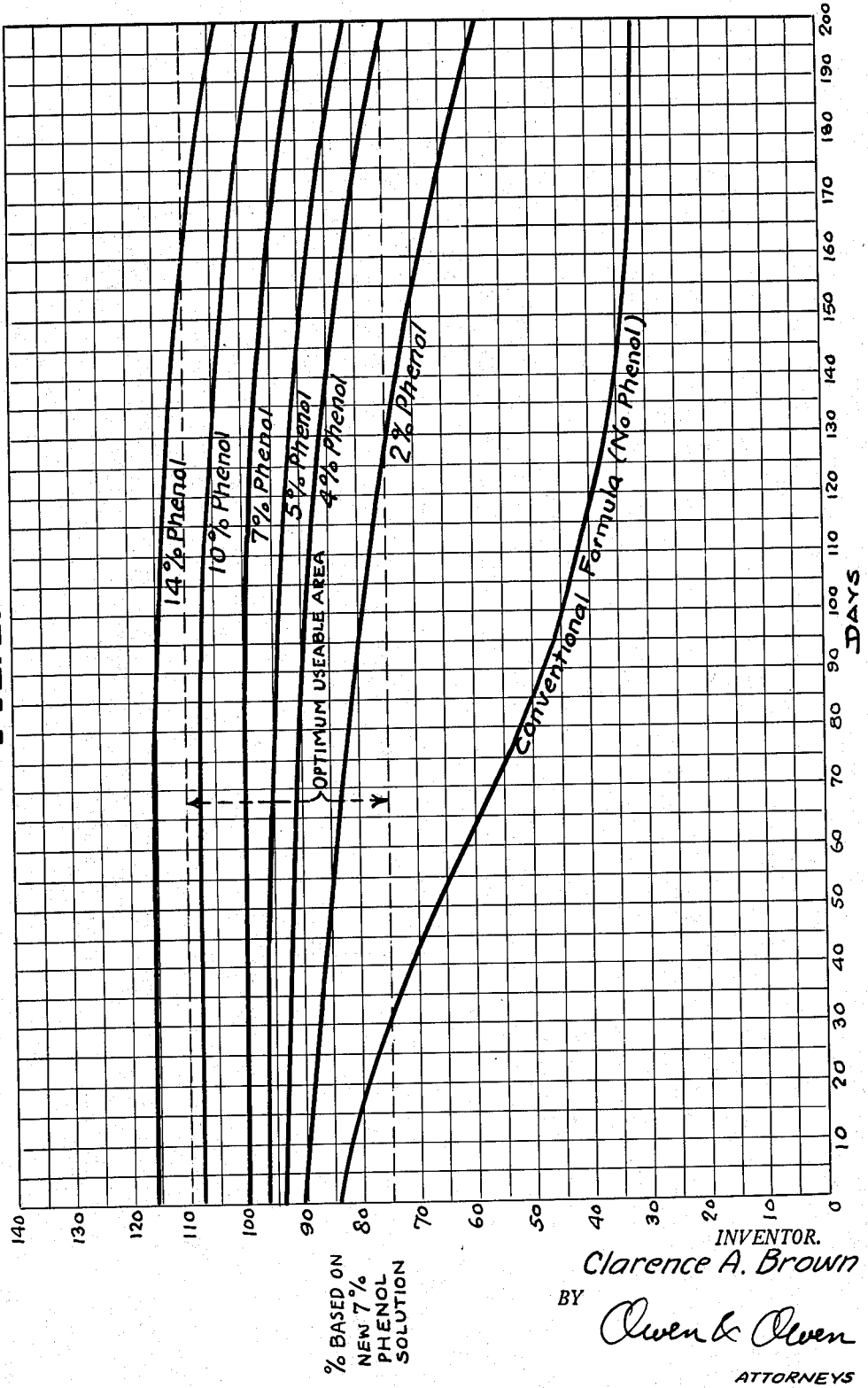
Fig. 2 is a graph illustrating the stabilizing effect upon acid resistance resulting from phenol additions to similar dispersions.

The acid resistance of the coating produced from the dichromated polyvinyl alcohol dispersions is extremely critical where this dispersion is used in the production of printing plates, and the like, which require acid etching. The compositions tested in Fig. 2 include the conventional formula, above set forth, and variations of this formula containing the phenol additions indicated on the graph. The data in Fig. 2 were obtained by coating a magnesium plate with the dichromated polyvinyl alcohol dispersion indicated in the graph, exposing the plate to light, and subsequently washing it with water to effect development. The so developed plate was immersed in a 3 per cent chromatic acid solution for about one minute and then removed and heated for a period of approximately ten minutes at 350° F. These treated plates were then immersed in a 5 per cent nitric acid solution and the time required for the break down of the coating was recorded. The percentages which form the ordinates in the graph are based upon a time comparison of break down time with that of a fresh dispersion having the conventional formula to which has been added seven per cent phenol.

The acid resistance of the conventional formula falls below the desired minimum within about thirty days, while the addition of 2 per cent phenol to the conventional formula will increase the shelf life of the dispersion as regards its acid resistance, to approximately 120 days or an increase of four times the useful life of the dispersion without the phenol addition. Additional amounts of phenol further increase the acid resistance of the dichromated polyvinyl alcohol dispersions, and there does not appear to be any upper limit to the phenol additions from the stand-point of acid resistance. As above noted, however, the viscosity of the dispersion will increase to the point of being non-usable where more than 12 per cent phenol is added.

It is of considerable practical importance that the coatings made from the dichromated polyvinyl alcohol dispersions retain their ability to form adherent image portions upon the printing plates, or the like, upon relatively short exposures to light. It is known that dichromated polyvinyl alcohol dispersions require longer exposure times as the dispersions age. To obtain data upon the effect of phenol additions upon the exposure times required, a seven per cent phenol composition having the formula above outlined was coated upon a magnesium plate. The coated plate was then tested using a Hurter & Driffield sector wheel, which is a disc type sensitometer having constant exposure with the time variable, and the minimum time required for the formation of an adherent image portion was recorded. These tests were repeated with the 7 per cent phenol dispersion at intervals extending over a period of 210 days.

Figure 3:
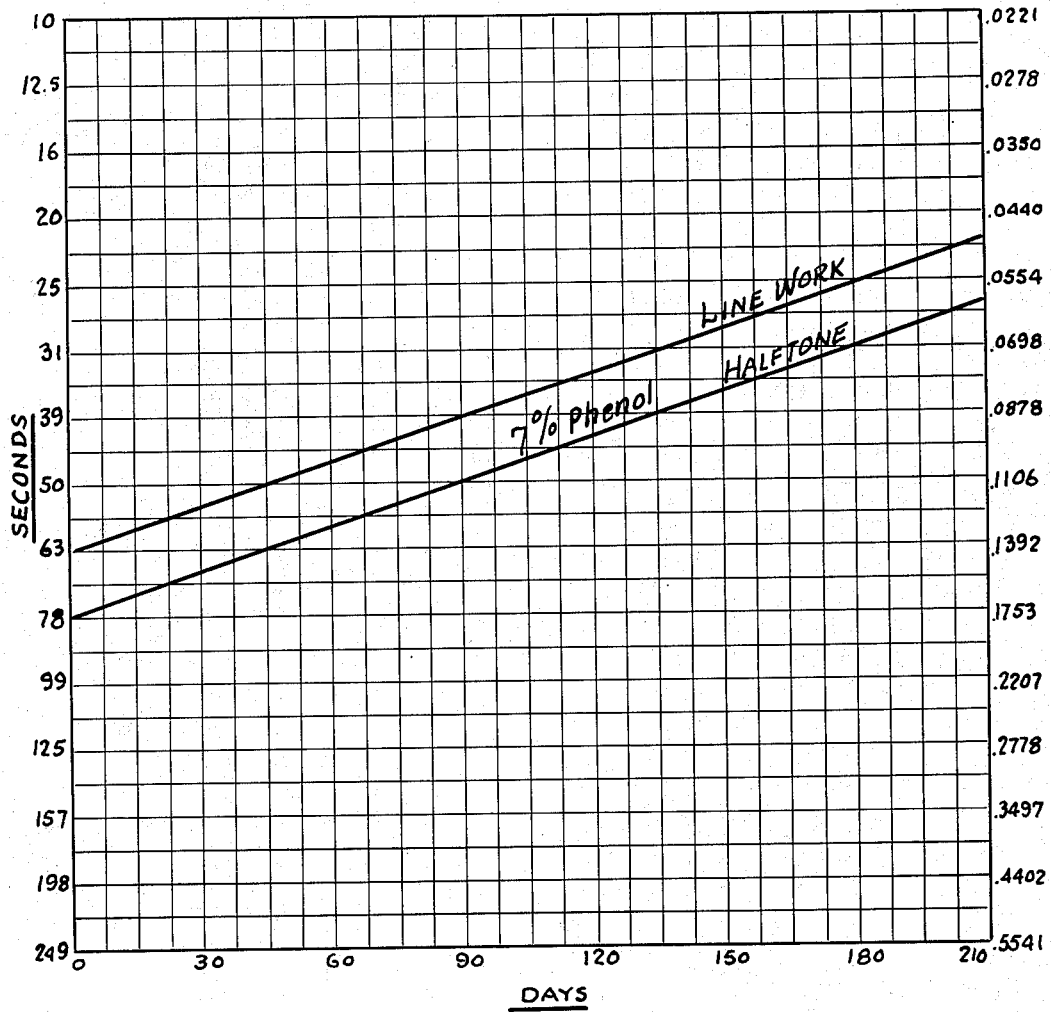
Fig. 3 is a graph illustrating the effect of phenol additions to the dichromated polyvinyl alcohol dispersions in regard to the minimum exposure required for solid image formation and complete adhesion of the coating to the metal plate.

From the data obtained, and graphically illustrated in Fig. 3, it is apparent that the minimum time required for the formation of an adherent image portion decreases upon ageing of the dispersion rather than increases. This is true whether line images or halftone images are formed. This decrease in time required is believed to be due primarily to the increased adherence produced by the phenol addition and not to any actual increase in light sensitivity. As a result, the increase in adherence produced by the phenol offsets the decrease in light sensitivity, so that the ageing of the dichromated polyvinyl alcohol dispersions which contain phenol presents no problem in connection with exposure times.

It has been found that the advantages discussed above obtained by using phenol in a dichromated polyvinyl alcohol dispersion, for example, increased acid resistance, reduced minimum exposure time required for solid image formation, and for complete adhesion of the coating to the plate, can be obtained if the dichromated polyvinyl alcohol dispersion employed contains less than about 2 per cent of the dichromate. Such dispersions are stable as regards their viscosity for extended periods of time, e. g., a year or more, and can be light sensitized by appropriate additions of a dichromate prior to use in the preparation of a printing plate or the like.

Figure 4 is a triaxial diagram on which the usable range of dichromate, polyvinyl alcohol and phenol calculated upon a dry basis as described above is defined by the area bounded by the lines AB, BC, CF, FG, GI and IA. The minimum percentage of polyvinyl alcohol is 76 per cent and the maximum percentage of both the phenol and the dichromate is approximately 12 per cent. The maximum amount of polyvinyl alcohol of approximately 99.6 per cent is determined by the minimum amounts of dichromate and phenol, which is approximately 0.02 per cent for the former and 0.4 per cent for the latter. These limits will vary somewhat with the particular dichromate sensitizer and polyvinyl alcohol resin which is employed, although the limits given are believed to provide a satisfactory guide to those skilled in the art.

Dispersions of dichromate, polyvinyl alcohol and phenol wherein the dichromate content is from about 2 per cent to about 12 percent, and which dispersions are therefore light sensitized, are represented in Fig. 4 by the area bounded by the lines AB, BC, CD, and DA. Such dispersions containing insufficient dichromate to be light sensitized are represented by the area bounded by the lines DF, FG, GI, and ID. All dispersions of composition represented by this latter area of the composition diagram of Fig. 4 are sufficiently chemically stable that they can be used after standing for substantial periods of time, e. g., a year or more, in the preparation of printing plates or the like, after appropriate additions of a dichromate to produce a light sensitized composition. However, dispersions of composition represented by the area bounded by the lines EF, FG, GH, and HE are preferred, because, in addition to being chemically stable, these dispersions are also stable in color, while dispersions represented by the area bounded by the lines DE, EH, HI, and ID are likely, upon standing, to undergo a slight color change, which color change may occasionally cause doubt in the mind of a possible user as to the chemical condition of the composition. However, it has been found that compositions represented by the area bounded by the lines DE, EH, HI, and ID are satisfactory after color change, and are, therefore, operable.

The compositions represented by the various points in Fig. 4 are presented in Table I, below:

| Point | Percent | | |
|---|---|---|---|
| | Polyvinyl Alcohol | Dichromate | Phenol |
| A | 96 | 2 | 2 |
| B | 86 | 12 | 2 |
| C | 76 | 12 | 12 |
| D | 86 | 2 | 12 |
| E | 87.6 | 0.4 | 12 |
| F | 87.98 | 0.02 | 12 |
| G | 99.58 | 0.02 | 0.4 |
| H | 99.2 | 0.4 | 0.4 |
| I | 97.8 | 2 | 0.4 |

The dichromated polyvinyl alcohol-phenol dispersions disclosed herein are particularly suited for the manufacture of printing plates, or the like. For this use it is usually preferred that the total solids content of the dispersions be from about 6 per cent to about 14 per cent and most desired that it be from about 8 per cent to about 10 per cent. The percentages of phenol and dichromate given herein on a dry weight basis for stabilizing polyvinyl alcohol dispersions are entirely satisfactory when the dispersion contains a percentage of solids within the indicated range. These percentages are also satisfactory if a more concentrated solution containing a higher percentage of solids is prepared for eventual dilution prior to use in making a printing plate or the like. It is usually disadvantageous to prepare a more dilute dispersion containing a lower percentage of solids than that indicated because of unnecessary shipping cost, and difficulties involved in bringing such solution to the proper percentage of solids for eventual use. However, a dispersion containing even a substantially lower percentage of solids than that indicated above is stabilized and given increased shelf life by virtue of additions as described herein. If however, for example, the amount of water in such a dispersion is approximately doubled, the minimum percentages of phenol and dichromate on a dry weight basis should be approximately doubled in order effectively to prevent molding of the compositions.

Preferably, the dichromates used in dispersions according to the invention are ammonium dichromate or alkali metal dichromates, as these materials are least likely to interfere with chemical reactions involved in the processing of printed plates or the like.

It is apparent from the above detailed discussion that the addition of phenol to dichromated polyvinyl alcohol dispersions greatly increases the shelf life of these solutions and makes them commercially practical. In addition to stabilizing the viscosity of these solutions, the phenol addition increases the acid resistance of the coatings formed therefrom as well as the adherence of these coatings to the metal plates. More uniform coatings having better continuity of film may also be obtained by practicing the present invention. Furthermore, a smaller amount of dichromate sensitizer may be employed when phenol is added than when it is absent.

It will be apparent that various changes and modifications can be made from the specific illustrative embodiments of the invention described in connection with the attached drawings without departing from the spirit of the claims.

This is a continuation-in-part of application Serial No. 161,245, filed May 10, 1950, now abandoned.

Having described the invention I claim:

1. A light sensitive coating composition which consists essentially of at least 76 per cent polyvinyl alcohol, from 2 to 12 per cent dichromate sensitizer and from 2 to 12 per cent phenol.

2. A light sensitive coating composition which consists essentially of at least 76 per cent polyvinyl alcohol, from 2 to 12 per cent dichromate sensitizer and from 2 to 12 per cent phenol, calculated upon the dry weight of these materials, and containing sufficient water to obtain the desired viscosity.

3. A light sensitive coating composition which consists essentially of at least 76 per cent polyvinyl alcohol, from 2 to 12 per cent ammonium dichromate sensitizer and from 2 to 12 per cent phenol.

4. In a lithographic printing base comprising a metal base plate, and a light sensitized coating affixed thereto, the improvement that consists in a light sensitized coating consisting essentially of at least 76 per cent of polyvinyl alcohol, from 2 to 12 per cent of a dichromate sensitizer, and from 0.4 to 12 per cent of phenol.

5. In a lithographic printing base comprising a metal base plate, and a light sensitized coating affixed thereto, the improvement that consists in a light sensitized coating consisting essentially of at least 76 per cent of polyvinyl alcohol, from 2 to 12 per cent of ammonium dichromate sensitizer, and from 0.4 per cent to 12 per cent of phenol.

6. A stabilized light sensitizable coating composition which consists essentially of an aqueous dispersion of polyvinyl alcohol, from about 0.02 per cent to about 2 per cent of a dichromate, and from about 0.4 per cent to about 12 per cent of phenol.

7. A stabilized light sensitizable coating composition which consists essentially of an aqueous solution of polyvinyl alcohol, from about 0.4 per cent to about 12 per cent of phenol and from about 0.02 per cent to about 0.4 per cent of a dichromate.

8. A stabilized coating composition which consists essentially of an aqueous dispersion of polyvinyl alcohol, a dichromate and phenol, in proportions as represented by the shaded area bounded by the lines AB, BC, CF, FG, GI, and IA in Fig. 4 of the attached drawings.

References Cited in the file of this patent

UNITED STATES PATENTS

| 2,174,629 | Greiner | Oct. 3, 1939 |
| 2,184,310 | Meigs et al. | Dec. 26, 1939 |

FOREIGN PATENTS

| 181,365 | Great Britain | July 26, 1923 |